Figure 1:
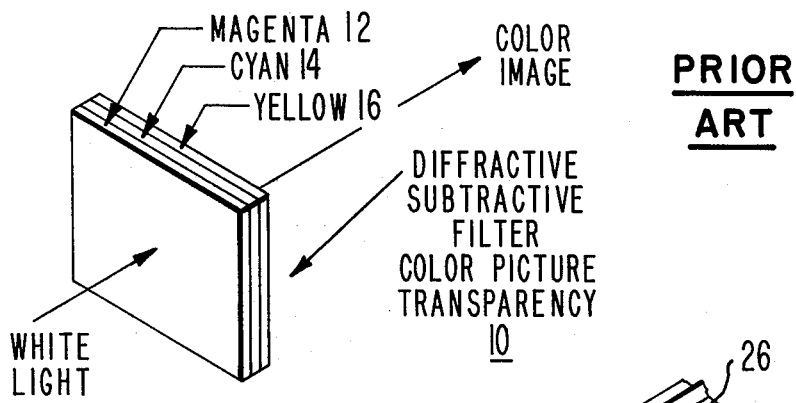

United States Patent [19]

Hannan

[11] 4,094,584
[45] June 13, 1978

[54] FORMAT FOR COLOR DIFFRACTIVE SUBTRACTIVE FILTERS

[75] Inventor: William James Hannan, Concord, Mass.

[73] Assignee: RCA Corporation, New York, N.Y.

[21] Appl. No.: 787,702

[22] Filed: Apr. 14, 1977

[30] Foreign Application Priority Data

Sep. 28, 1976 United Kingdom ............... 40134/76

[51] Int. Cl.² ........................... G02B 5/18; G03C 1/76
[52] U.S. Cl. ............................... 350/162 SF; 352/233; 352/238; 352/239; 428/29
[58] Field of Search .......................... 350/162 SF, 3.5; 352/239, 232, 233, 238, 237; 428/29; 96/27 H, 68, 78, 79; 358/5

[56] References Cited
U.S. PATENT DOCUMENTS

| 3,619,024 | 11/1971 | Frattarola | 350/3.5 |
| 3,790,245 | 2/1974 | Hannan et al. | 350/3.5 |
| 3,957,354 | 5/1976 | Knop | 350/162 SF |
| 4,057,326 | 11/1977 | Knop | 350/162 SF |

*Primary Examiner*—Ronald J. Stern
*Attorney, Agent, or Firm*—H. Christoffersen; Samuel Cohen; George J. Seligsohn

[57] ABSTRACT

Each one of three filters, corresponding to different primary subtractive colors of a color picture, is embossed as a relief pattern on the same side of a plastic film within a separate one of any three of four side-by-side regions into which the film is divided. This permits the film to be thrice-folded to both (1) superimpose the three filters substantially in registration with each other and (2) place the embossed side of the film within the interior of the thrice-folded film where said filters are protected.

5 Claims, 4 Drawing Figures

U.S. Patent  June 13, 1978  4,094,584

FORMAT FOR COLOR DIFFRACTIVE SUBTRACTIVE FILTERS

This invention relates to color diffractive subtractive filters and, more particularly, to an improved format for such color diffractive subtractive filters.

Reference is made to U.S. Pat. No. 3,957,354, which is directed to a diffractive subtractive color filtering technique. As is brought out in the patent, a diffractive subtractive filter corresponding to any one of three primary subtractive colors may consist of a square-wave diffraction grating embossed as a relief pattern in the surface of a plastic film. The particular subtractive primary color manifested by such a square-wave grating is determined by the depth of the grating. The patent also explains that a color picture transparency may be comprised of three superimposed diffractive subtractive filters, each corresponding to a different one of the three primary subtractive colors. The picture information manifested by the respective superimposed filters should be disposed in substantially registered relationship with each other.

In accordance with the principles of the present invention, the plastic film is divided into four side-by-side regions situated between a first outer edge and a second outer edge of the film. First and second adjacent ones of the four regions are located between the first outer edge and a midline half way between the first and second outer edges. Third and fourth adjacent ones of the four regions are located between the second outer edge and the midline. Each one of the three filters is embossed as a relief pattern on the same given side of the film within a different one of the four regions. The film is first folded at the junction of the first and second regions to provide that the first outer edge substantially coincides with the midline and the given side of the first region is in face-to-face relationship with the given side of the second region. The film is second folded at the junction of the third and fourth regions to provide that the second outer edge substantially coincides with the midline and the given side of the third region is in face-to-face relationship with the given side of the fourth region. The film is third folded at the midline to provide that the outer edges are within the interior thereof, and that all three of the filters are superimposed and are substantially in registration with each other.

In the drawings:

FIG. 1 is a diagramatic showing of a diffractive subtractive filter color-picture of the type disclosed in the aforesaid U.S. Pat. No. 3,957,354, and FIGS. 2, 3 and 4, taken together, illustrate an embodiment of the present invention.

As shown in FIG. 1, color-picture transparency 10 is comprised of three superimposed diffractive subtractive filters 12, 14 and 16, corresponding, respectively, to the primary subtractive colors magneta, cyan and yellow. As described in U.S. Pat. No. 3,957,354, each of these filters preferably comprises a square-wave diffraction grating embossed as a relief pattern into the surface of a given plastic film, such as PVC. Further, each of filters 12, 14 and 16, when illuminated with white light, discriminatingly diffracts certain wavelength components of the white-light spectrum into higher diffraction orders and transmits the remaining wavelength components of the white-light spectrum into the zero diffraction order. This wavelength discrimination is determined by the respective depth of each of the three square-wave gratings and the index of refraction of the plastic film. In particular, each of filters 12, 14 and 16 has that different specified depth which corresponds, respectively, to magenta, cyan or yellow, as the case may be. By effectively altering the proportion of diffractive structure to non-diffractive structure from point to point over the area of each filter, color saturation of that filter may be controlled.

The saturation of magenta filter 12 at any spot thereof varies inversely with the amount of green at that spot in the color picture. Similarly, the saturation of cyan filter 14 at any spot varies inversely with the amount of red at that spot and the saturation of yellow filter 16 at any spot varies inversely with the amount of blue in the color picture at that spot. It is therefore essential that the picture information manifested respectively by filters 12, 14 and 16 be substantially in registration with each other to provide a proper zero order diffraction color image. It is also highly desirable that all of the filter relief patterns be protected from dust, fingerprints, moisture, etc., by being situated in the interior of transparency 10, rather than on either exterior surface thereof. The format of the present invention, shown in FIGS. 2, 3 and 4, meets both these requirements.

Figure 2:
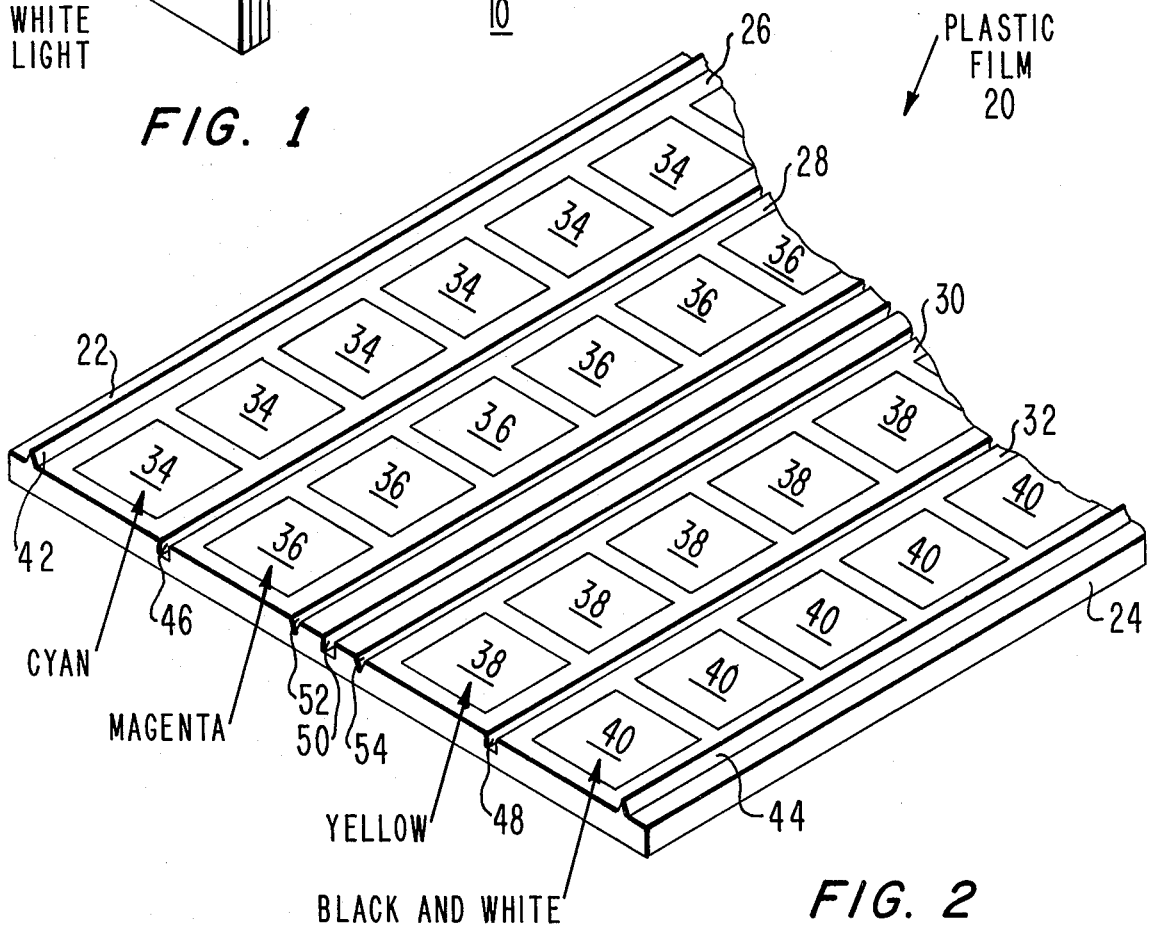

Referring to FIG. 2, there is shown plastic film 20, which, for illustrative purposes, is assumed to be a motion-picture film comprising a series of frames of diffractive subtractive filter color-picture transparencies. More specifically, film 20 between first outer edge 22 thereof and second outer edge 24 thereof is divided into the four side-by-side regions 26, 28, 30 and 32. Cyan-manifesting diffractive subtractive filters 34, each corresponding to a separate motion-picture frame, are embossed as relief patterns on a given side of plastic film 20 within first region 26. In a similar manner, magenta-manifesting diffractive subtractive filters 36 and yellow-manifesting diffractive subtractive filters are embossed as relief patterns within second region 28 and third region 30, respectively, situated on the same given side plastic film 20 as cyan-manifesting filters 34.

Each of cyan-manifesting filters 34, magenta-manifesting filters 36, and yellow-manifesting 38 comprises a squarewave grating, as is more fully described in the aforesaid U.S. Pat. No. 3,957,354. If, besides color, each frame of the motion picture also includes black-and-white information (such as captions or legending), fourth region 32 may have black-and-white sinusoidal diffractive subtractive filters 40 embossed as relief patterns on the same given side of plastic film 20 as filters 34, 36, and 38. In cases requiring only low resolution color, such as for maps, cartoons, etc., the superposition of high resolution black-and-white line-drawing information on low resolution color information tends to reduce required registration accuracy. Black-and-white sinusoidal diffractive subtractive filters are disclosed both in U.S. Pat. No. 3,732,363 and U.S. patent application Ser. No. 671,105, filed Mar. 29, 1976 by Gale and assigned to the same assignee as the present invention. Alternatively, black-and-white filters 40 may be omitted, so that in this case fourth region 32 is left empty.

Figure 3:
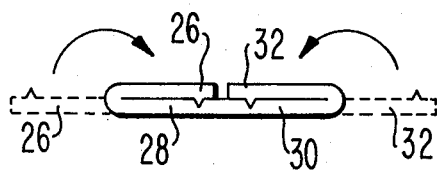

Situated between first outer edge 22 and first region 26 is first V-ridge 42 and situated between second edge 24 and fourth region 32 is second V-ridge 44. Situated between first region 26 and second region 28 is first fold groove 46 and situated between third region 30 and fourth region 32 is second fold groove 48. Situated along a midline halfway between first outer edge 22 and second outer edge 24 is third fold groove 50. Situated on one side of third fold groove 50 is first V-groove 52 for receiving and securing first V-ridge 42 when first region 26 is folded at first fold groove 46 over second region 28, as shown in FIG. 3. Situated on the other side of third fold groove 50 is second V-groove 54 for receiving and securing second V-ridge 44 when fourth region 32 is folded at second fold groove 48 over third region 30, as shown in FIG. 3. After making these two folds, shown in FIG. 3, plastic film 20 is again folded at third fold groove 50 to provide the final format shown in FIG. 4. Ridges and grooves 42, 44, 48, 50, 52 and 54 operate as alignment guides to ensure that cyan filters 34, magenta filters 36 and yellow filters 38 are in substantially superimposed registration with each other in the final folded format shown in FIG. 4. Although not specifically shown, additional alignment guides may be employed to secure the third fold shown in FIG. 4. In addition as is known in the art, reference marks useful for automatic alignment during folding may be embossed in each of the four regions.

Figure 4:
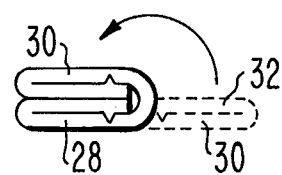

It is to be noted that in the final folded format shown in FIG. 4, both first and second outer edges 22 and 24 are situated within the interior of the folded format. This prevents moisture and dust from reaching the embossed surface. In a format of only three folded regions (one for each subtractive primary color) at least one outer edge would not be within the interior of the folded format.

For illustrative purposes, the cyan, magenta and yellow filters have been shown in FIG. 2 as respectively occupying the first, second and third of the four side-by-side regions into which plastic film 20 is divided. However, the cyan, magenta and yellow filters may occupy any three of the four side-by-side regions.

What is claimed is:

1. In a color-picture transparency comprised of three superimposed diffractive subtractive filters each corresponding to a different one of three primary subtractive colors, the picture information manifested by said respective superimposed filters being disposed in substantially registered relationship with each other, the improvement wherein said color picture transparency comprises:

a plastic film divided into four side-by-side regions situated between a first outer edge and a second outer edge of said film with first and second adjacent ones of said four regions located between said first outer edge and a midline halfway between said first and second outer edges and with third and fourth adjacent ones of said four regions located between said second outer edge and said midline;

each one of said three filters being embossed as a relief pattern on the same given side of said film within a different one of three of said four regions;

said film being first folded at the junction of said first and second regions to provide that said first outer edge substantially coincides with said midline and said given side of said first region is in face-to-face relationship with said given side of said second region;

said film being second folded at the junction of said third and fourth regions to provide that said second outer edge substantially coincides with said midline and said given side of said third region is in face-to-face relationship with said given side of said fourth region, and said film being third folded at said midline to provide that said outer edges are within the interior thereof and that all three of said filters are superimposed and are substantially in registration with each other.

2. The color-picture transparency defined in claim 1, wherein the remaining one of said four regions in which none of said three filters is embossed has embossed therewith a fourth diffractive subtractive filter corresponding to additional black-and-white information incorporated in said color-picture.

3. The color-picture transparency defined in claim 1 wherein said plastic film includes alignment guides situated on said given side at predetermined positions to ensure that said filters are substantially in registration with each other when said film is first, second and third folded.

4. The color-transparency defined in claim 3, wherein said alignment guides include means for securing said first and second folds of said film.

5. The color-transparency defined in claim 3, wherein said alignment guides includes a first groove in said film between said first and second regions for delineating said second fold, and a third groove along said midline for delineating said third fold.

* * * * *